(12) United States Patent
Fric et al.

(10) Patent No.: US 8,038,395 B2
(45) Date of Patent: Oct. 18, 2011

(54) PULSED TORQUE CONTROL OF WIND TURBINE PITCH SYSTEMS

(75) Inventors: Thomas Frank Fric, Greer, SC (US); Negel Ernesto Martin, West Palm Beach, FL (US); Bryan J. Troise, Cantonment, FL (US)

(73) Assignee: General Electric Company, Schenectady, NY (US)

( * ) Notice: Subject to any disclaimer, the term of this patent is extended or adjusted under 35 U.S.C. 154(b) by 816 days.

(21) Appl. No.: 12/057,627

(22) Filed: Mar. 28, 2008

(65) Prior Publication Data

US 2009/0246021 A1      Oct. 1, 2009

(51) Int. Cl.
*F01D 5/18* (2006.01)
(52) U.S. Cl. .............................. 416/1; 416/25; 416/147
(58) Field of Classification Search ................ 416/1, 25, 416/26, 27, 30, 147, 155, 156, 158; 91/362
See application file for complete search history.

(56) References Cited

U.S. PATENT DOCUMENTS

| 4,426,192 | A  | * | 1/1984 | Chertok et al. ................... 416/1 |
| 7,015,595 | B2 | * | 3/2006 | Feddersen et al. ............. 290/44 |
| 7,172,392 | B2 |   | 2/2007 | Wastling et al. |
| 7,229,250 | B2 | * | 6/2007 | McCallum et al. .............. 416/1 |
| 7,488,155 | B2 | * | 2/2009 | Barbu et al. ...................... 416/1 |
| 2005/0201862 | A1 |   | 9/2005 | Wastling et al. |
| 2007/0057516 | A1 |   | 3/2007 | Mever et al. |
| 2007/0205602 | A1 |   | 9/2007 | Willey et al. |

* cited by examiner

*Primary Examiner* — Edward Look
*Assistant Examiner* — Andrew C Knopp
(74) *Attorney, Agent, or Firm* — McNees Wallace & Nurick LLC

(57) ABSTRACT

A wind turbine pitch control system is disclosed that provides a pulsed torque to the blade pitch actuator if continuous torque fails to adjust the blade pitch angle to a commanded pitch angle. This invention provides a cost-effective way to increase peak torque capability for existing wind turbines that have problems, under certain operating conditions, moving blades per the control command.

18 Claims, 4 Drawing Sheets

US 8,038,395 B2

PULSED TORQUE CONTROL OF WIND TURBINE PITCH SYSTEMS

FIELD OF THE INVENTION

The present disclosure relates generally to wind power energy production, and more particularly to a method and system for controlling the pitch angle of a rotor blade(s).

BACKGROUND OF THE INVENTION

Recently, wind turbines have received increased attention as an environmentally safe and relatively inexpensive alternative energy source. With this growing interest, considerable efforts have been made to develop wind turbines that are reliable and efficient.

Generally, a wind turbine includes a plurality of blades coupled to a rotor through a hub. The rotor is mounted within a housing or nacelle, which is positioned on top of a tubular tower or base. Utility grade wind turbines (i.e. wind turbines designed to provide electrical power to a utility grid) can have large rotors (e.g., thirty or more meters in diameter). Blades on these rotors transform wind energy into a rotational torque or force that drives the rotor of one or more generators, rotationally coupled to the rotor.

During operation of at least some known wind turbines, rotor speed is controlled to prevent the wind turbine rotor from rotating at or above a predetermined speed that may damage components of the wind turbine. For example, at least some known wind turbines control rotor speed and/or power by pitching the rotor blades using a pitch drive system that changes an angle of the rotor blades, thereby changing the aerodynamic torque of the rotor. Since their introduction, wind turbines have continuously increased in physical size and electrical power output. However, as rotor diameter and therefore rotor blade lengths increase, loading on the blades and rotor system increases, and friction within the pitch drive system may also increase, both of which may increase the torque required by the pitch drive motor to pitch the rotor blades.

Wind turbines can experience operational conditions where the capability of the pitch system is such that the blade(s) cannot follow the commanded pitch angle. Variable pitch control is required in order to limit maximum power output and alleviate wind loads on the turbine. Due to variation in the pitch system components and operating environment factors including electrical system limitations, pitch bearing mechanical limitations, blade mechanical limitations, and wind conditions and loads, faults due to blade positions too far from command points can occur, which can lead to turbine unavailability during relatively high wind (high power) conditions.

Prior methods of addressing the difficulty in moving wind turbine blades during blade angle operations include increasing the continuous or maximum power and current capability of the pitch system, increasing gearbox ratio between the pitch motor and blade bearing, replacing hardware such as bearings, and modification of turbine controls.

However, a cost-effective way is needed to increase the peak torque capability for existing and new turbines that may have problems under certain operating conditions in moving blades per the control command. In practice, this peak torque capability may only be needed a small fraction of operating time.

Thus, an objective of the present disclosure is to provide a cost effective method to increase peak torque capability for existing wind turbines that have problems, under certain operation conditions, moving blades according to a control command.

SUMMARY OF THE INVENTION

The object of the present invention is to provide a new a method of controlling a pitch control system of a wind turbine.

According to a first embodiment of the invention, a method of controlling a pitch control system includes comprising providing a nominal control signal to adjust a blade pitch angle of at least one rotor blade by operating the pitch control system at a nominal continuous torque to achieve a commanded pitch angle, determining if the commanded pitch angle has been achieved in response to the nominal control signal, and sending a pulsed control signal to the pitch control system to adjust the blade pitch angle of the at least one rotor blade by a pulsed peak torque if the nominal control signal has failed to achieve the commanded pitch angle.

According to another embodiment of the invention, a wind turbine is disclosed that includes a rotor comprising a hub, at least one rotor blade coupled to the hub, and a rotor shaft coupled to the hub for rotation therewithin, an electrical generator coupled to the rotor shaft, the electrical generator configured to couple to an electrical load, a blade pitch actuator coupled to the at least one rotor blade for controlling an angle of pitch of the at least one rotor blade, and a control system coupled to said blade pitch actuator. The control system is configured to provide a command pitch signal to apply a continuous torque to the blade pitch actuator to achieve the commanded pitch angle, and wherein the control system is further configured to provide a pulsed command pitch signal to apply a pulsed peak torque to the blade pitch actuator to achieve the commanded pitch angle if the command pitch signal fails to achieve the commanded pitch angle.

According to still yet another embodiment of the invention, a pitch control system is disclosed that includes a blade pitch actuator coupled to the at least one rotor blade of a wind turbine for controlling an angle of pitch of the at least one rotor blade and a control system coupled to said blade pitch actuator. The control system is configured to provide a command pitch signal to apply a continuous torque to the blade pitch actuator to achieve the commanded pitch angle, and wherein the control system is further configured to provide a pulsed command pitch signal to apply a pulsed peak torque to the blade pitch actuator to achieve the commanded pitch angle if the command pitch signal fails to achieve the commanded pitch angle.

Further aspects of the method and system are disclosed herein. The features as discussed above, as well as other features and advantages of the present invention will be appreciated and understood by those skilled in the art from the following detailed description and drawings.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
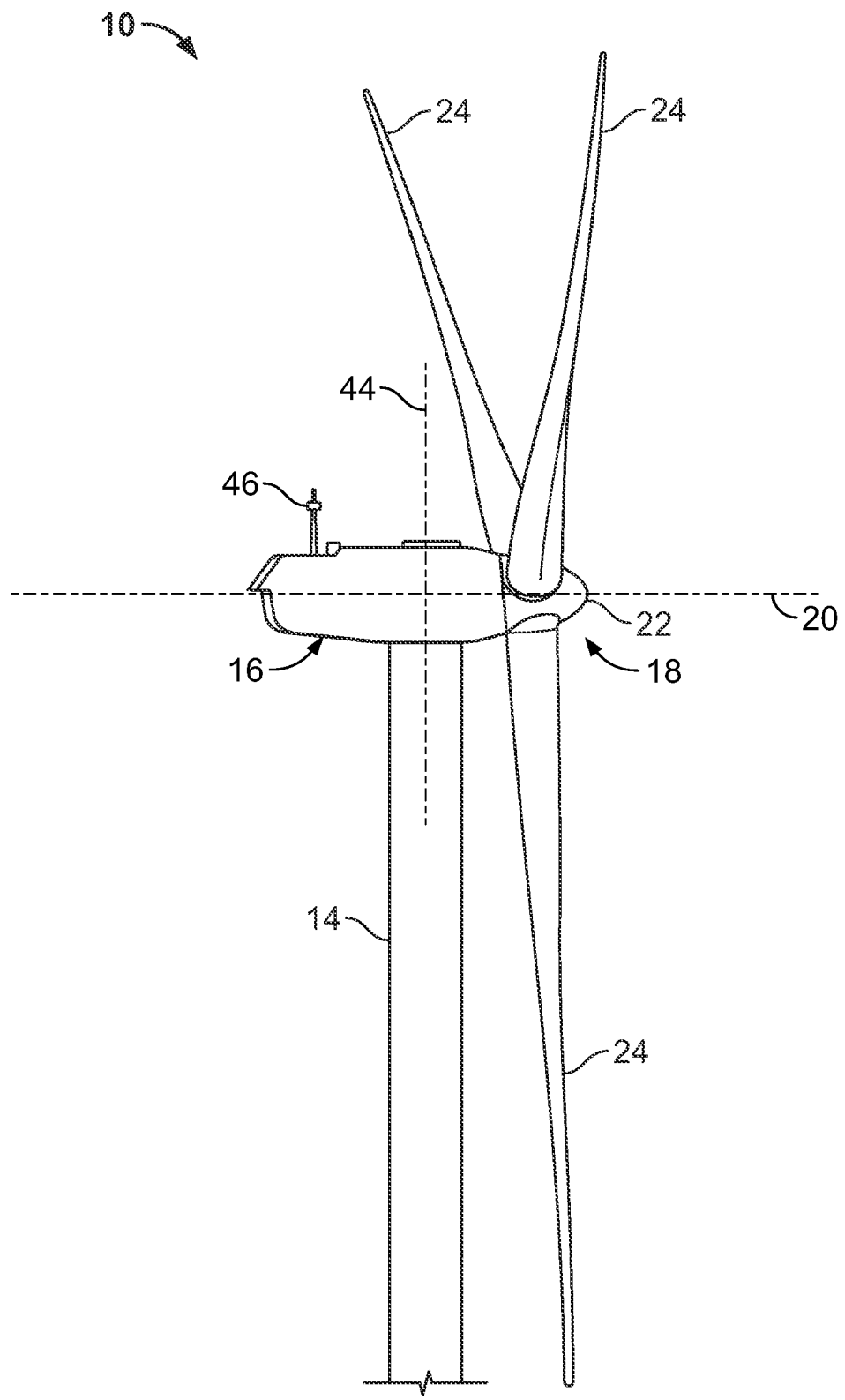
FIG. 1 illustrates an exemplary configuration of a wind turbine.

Referring to FIG. 1, an exemplary wind turbine 10 according to the present invention is disclosed. The wind turbine 10 includes a nacelle 16 mounted atop a tall tower 14, only a portion of which is shown in FIG. 1. Wind turbine 10 also includes a wind turbine rotor 18 that includes one or more rotor blades 24 attached to a rotating hub 22. Although wind turbine 10 illustrated in FIG. 1 includes three rotor blades 24, there are no specific limits on the number of rotor blades 24 required by the present invention. The height of tower 14 is selected based upon factors and conditions known in the art. Blades 24 may have any length. For example, in some embodiments, on or more rotor blades are about 0.5 meters long, while in some embodiments one or more rotor blades are about 50 meters long. Other examples of blade 24 lengths include 10 meters or less, about 20 meters, about 37 meters, and about 40 meters. Still other examples include rotor blades between about 50 and about 100 meters long.

Figure 2:
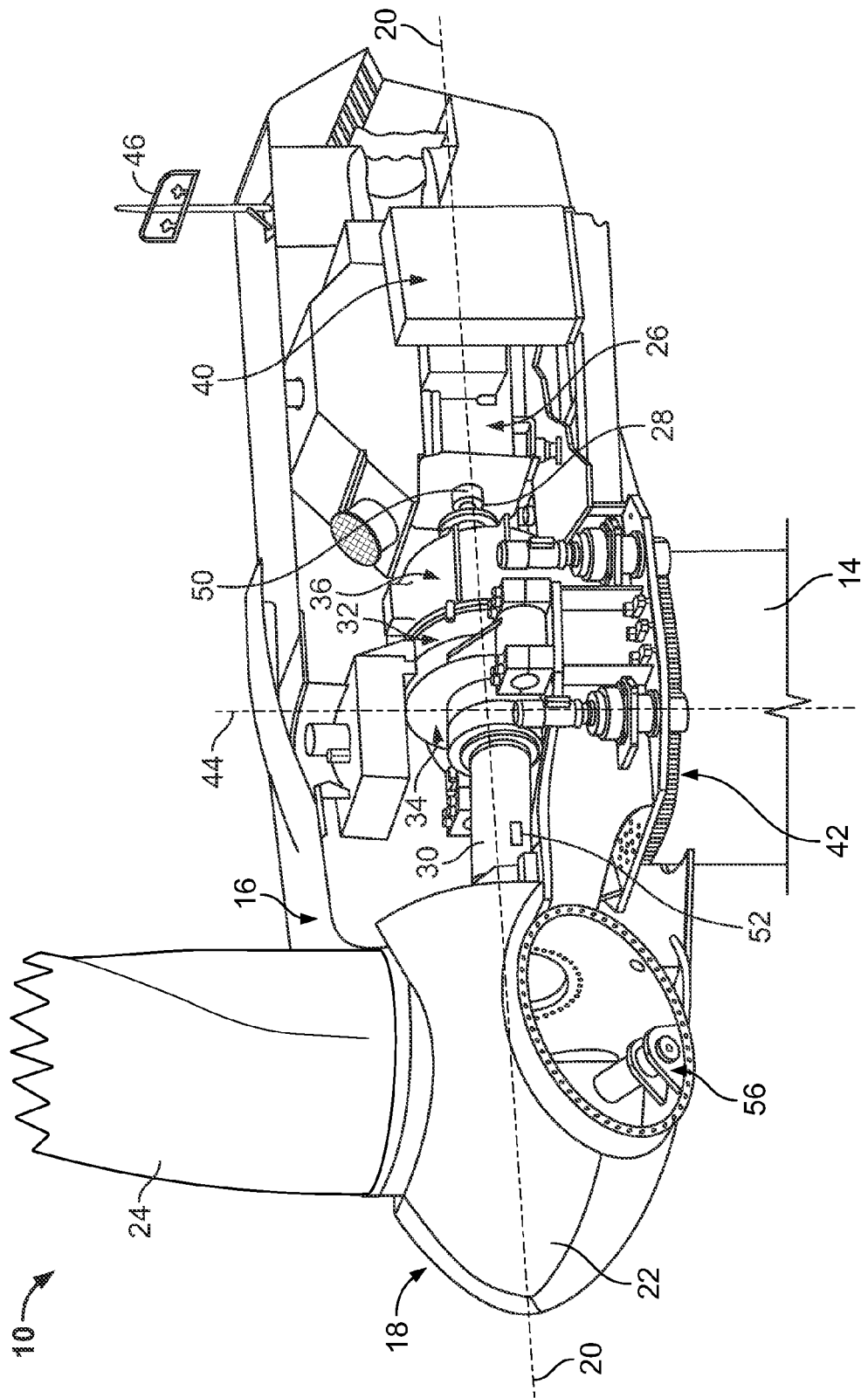
FIG. 2 illustrates a cut-away perspective view of a nacelle of the exemplary wind turbine configuration shown in FIG. 1.

In some configurations and referring to FIG. 2, various components are housed in nacelle 16 atop tower 14. An electrical generator 26 is coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generation rotor. In other embodiments, the generator rotor is directly coupled to rotor shaft 30, sometimes referred to as a "direct-drive wind turbine". In the exemplary embodiment, generator rotor shaft 28 is coupled to rotor 28 through a gearbox 32, although in other embodiments generator rotor shaft 28 is coupled directly to rotor shaft 30. More specifically, in the exemplary embodiment gearbox 32 has a low speed side 34 coupled to rotor shaft 30 and a high speed side 36 coupled to generator rotor shaft 28. The torque of rotor 18 drives the generator rotor to thereby generate variable frequency AC electrical power. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to a power grid (not shown), coupled to generator 26. Frequency converter 38 may be located anywhere within or remote to wind turbine 10. For example, in the exemplary embodiment frequency converter 38 is located within a base (not shown) of tower 14.

In some embodiments, wind turbine 10 may include a control system(s) 40 coupled to some or all of the components of wind turbine 10 for generally controlling operation of wind turbine 10 and/or as some or all of the components thereof (whether such components are described and/or illustrated herein). For example, in the exemplary embodiment, control system(s) 40 generally controls the operation of the rotor 18. In the exemplary embodiment, control system(s) 40 is mounted within nacelle 16. However, additionally or alternatively, one or more control system(s) 40 may be used to control rotor 18, and the one or more control system(s) 40 may be remote from nacelle 16 and/or other components of wind turbine 10. In this exemplary embodiment, control system(s) 40 may be used for, but is not limited to, overall system monitoring and control including, for example, pitch and speed regulation, high-speed shaft and yaw brake application, yaw and pump motor application, and/or fault monitoring. Additionally, in this exemplary embodiment, a control system(s) 40 is located (but not shown) in the rotor hub 22 for controlling the pitch of the blades 24. The control system(s) 40 located in the hub 22 operates with the control system(s) 40 located in the nacelle 16 for directing overall system monitoring and control. Alternative distributed or centralized control architectures may be used in some embodiments.

In some embodiments, wind turbine 10 may include a disk brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44 for changing a yaw of rotor 18, and more specifically for changing a direction faced by rotor 18 to, for example, adjust an angle between the direction faced by rotor 18 and a direction of wind. Yaw system 42 may be coupled to control system(s) 40 for control thereby. In some embodiments, wind turbine 10 may include an anemometry device 46 for measuring wind speed and/or wind direction. Anemometry device 46, in some embodiments, may be coupled to control system(s) 40 for sending measurements to control system 40 for processing thereof. For example, and although anemometry device 46 may be coupled to control system(s) 40 for sending measurements thereto for controlling other operations of wind turbine 10, anemometry device 46 may send measurements to control system(s) 40 for controlling and/or changing a yaw of rotor 18 using yaw system 42. Alternatively, anemometry device 46 may be coupled directly to yaw system 42 for controlling and/or changing a yaw of rotor 18.

Wind turbine 10 may also include a plurality of angle sensors (not shown), each coupled to a corresponding blade 24 for measuring a pitch of each blade 24, or more specifically an angle of each blade 24 with respect to a wind direction and/or with respect to rotor hub 22. The angle sensors may be any suitable sensor having any suitable location within or remote to wind turbine 10, such as, but not limited to, optical encoders within pitch system 56 (described below). In some embodiments, the angle sensors are coupled to control system(s) 40 for sending pitch measurements to control system(s) 40 for processing thereof. In the exemplary embodiment, wind turbine 10 includes one or more sensors 50 coupled to generator rotor shaft 28 for measuring a speed of rotation of rotor shaft 28 and/or a torque of generator rotor shaft 28. Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof. Moreover, in the exemplary embodiment, wind turbine 10 includes one or more sensors 52 coupled to rotor shaft 30 for measuring a speed of rotation of rotor shaft 28 and/or a torque of rotor shaft 30. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to control system(s) 40 for sending measurements to control system(s) 40 for processing thereof. Furthermore, in the exemplary embodiment, wind turbine 10 includes one or more power sensors (not shown) coupled to generator 26 for measuring an electrical power output of generator 26. In some embodiments, the power sensor(s) are coupled to control system(s) 40 for processing thereof. Power sensor(s) may be any suitable sensor having any suitable location within or remote to wind turbine 10, such as, but not limited to, Hall effect current transducers (CTs) and/or capacitive voltage transducers (CVTs).

Wind turbine 10 may also include one or more other sensors (not shown) coupled to one or more components of wind turbine 10 and/or the electrical load, whether such component(s) are described or illustrated herein, for measuring parameters of such component(s). Such other sensor(s) may include, but are not limited to, sensors configured to measure displacements, yaw, pitch, moments, strain, stress, twist, damage, failure, rotor torque, rotor speed, an anomaly of power supplied to any component of wind turbine 10 and/or the electrical load at any location thereof for measuring any parameter thereof, whether such components, location and/or parameter is described and/or illustrated herein.

Figure 4:
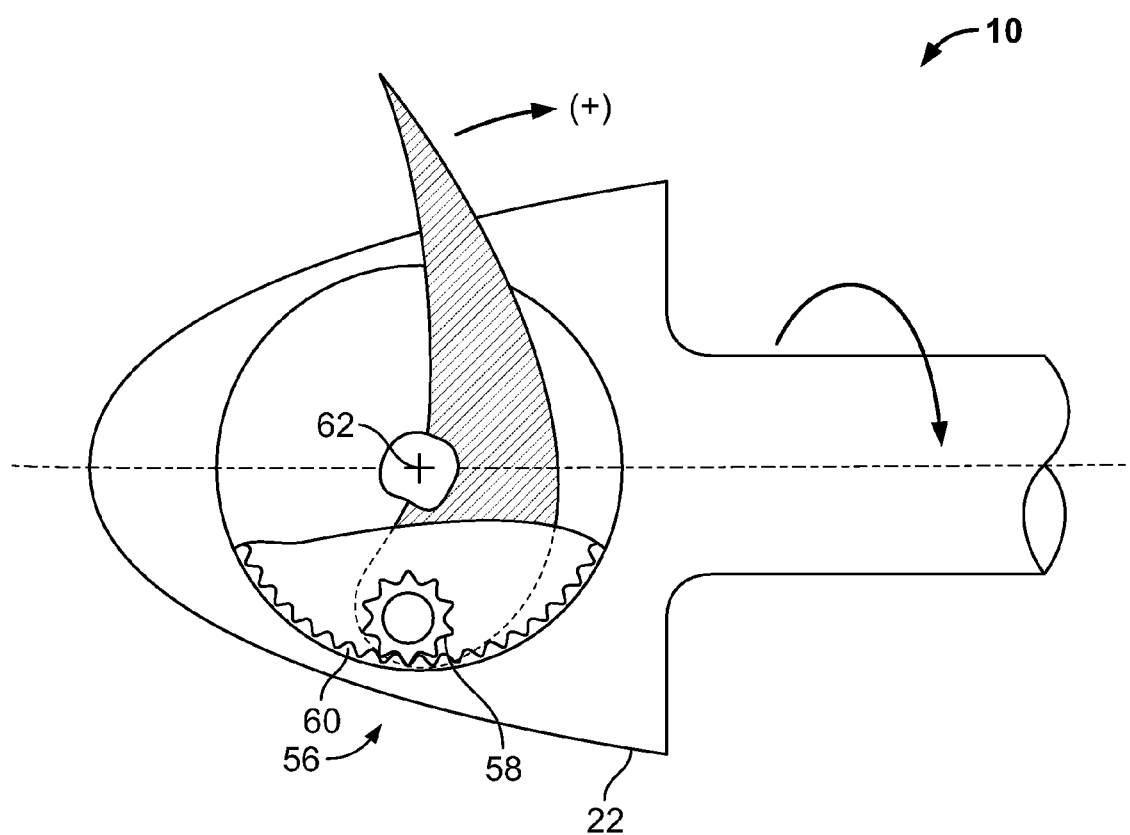
FIG. 4 is an illustration of an exemplary embodiment of a pitch system for changing a pitch of a rotor blade of the wind turbine shown in FIG. 1.

Wind turbine 10 includes a variable blade pitch system 56 for controlling, including but not limited to changing, a pitch angle of rotor blade(s) 24 (shown in FIGS. 1 and 2) with respect to a wind direction. FIG. 4 is a cross-sectional view of a portion of hub 22 illustrating an exemplary embodiment of pitch system 56. Pitch system 56 is coupled to a control system(s) 40 (not shown) located with hub 22, which may be further coupled to the overall rotor control system(s) 40. Pitch system 56 includes one or more actuators including a pitch drive gear 58 and pitch ring gear 60 coupled to hub 22 and blade(s) 24 for changing the pitch angle of blade(s) 24 by rotating blade(s) 24 with respect to hub 22. In this exemplary embodiment, the pitch actuators are driven by an electrical motor (not shown) located in the hub 22. Furthermore, a motor and actuator are associated with each blade 24 for controlling pitch angle and each blade 24 individually. In this exemplary embodiment, the control system(s) 40 provides control to pitch each blade 24 individually, however, in alternative embodiments, the control system(s) 40 may control all blades to the same pitch angle.

Figure 3:
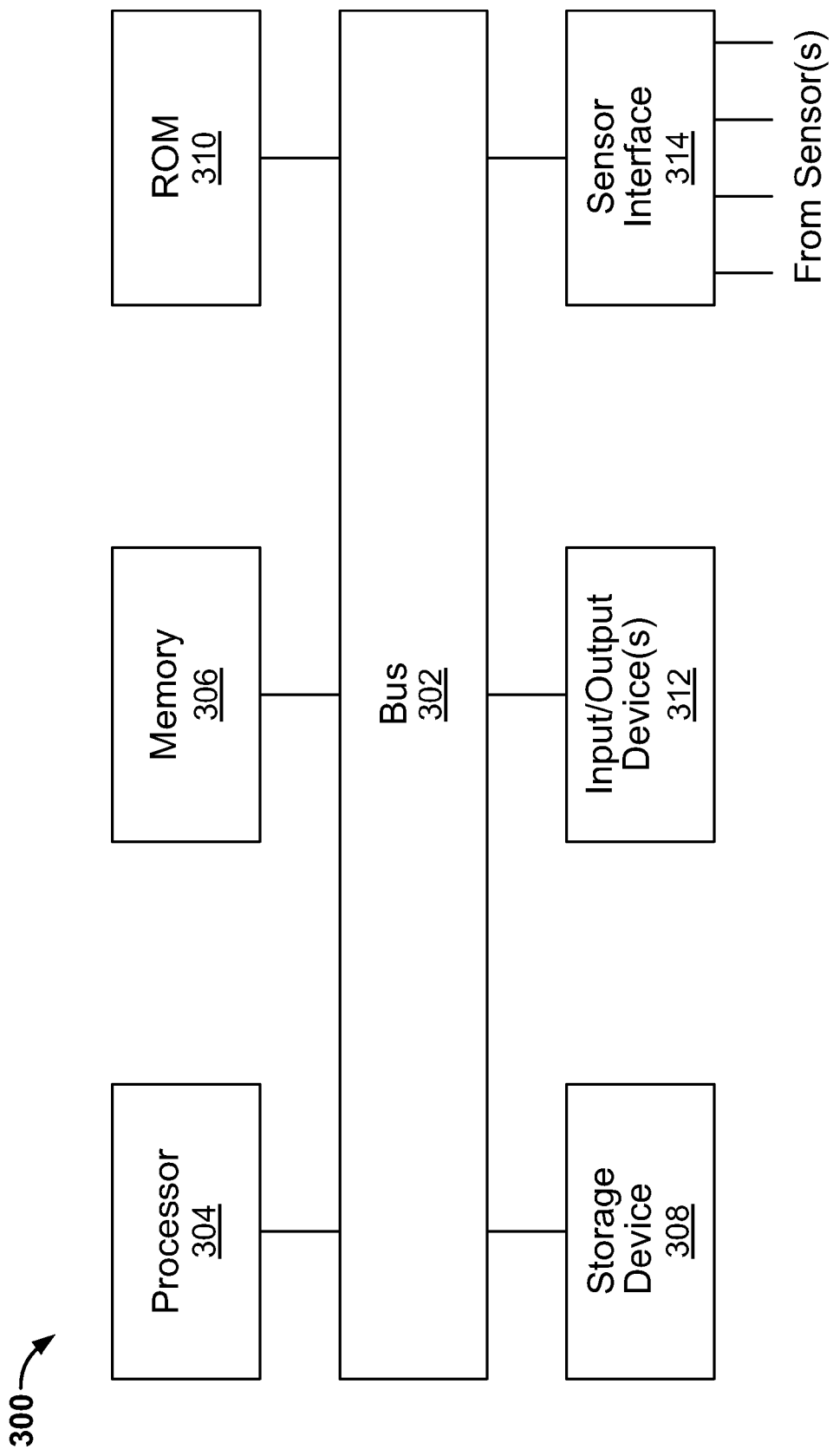
FIG. 3 is a block diagram of a configuration of a control system for the wind turbine configuration of FIG. 1.

In some configurations and referring to FIG. 3, a control system 40 for wind turbine 10 includes a bus 302 or other communications device to communicate information. One or more processor(s) 304 are coupled are coupled to bus 302 to process information, including information from sensors configured to measure displacements or moments. Control system 40 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 40 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 40 and to provide yaw control and pitch control outputs. Additionally, control system 40 components may be located in the nacelle 16, hub 22, tower 14 and/or other locations proximate to the wind turbine 10. In this particular example, control system 40 includes pitch control components located in the hub 22 in communication with control system 40 components located in the nacelle 16 for controlling the pitch of the blades 24. Instructions are provided to memory from a storage device, such as a magnetic disk, a read-only memory (ROM) integrated circuit, CD-ROM, DVD, via a remote connection that is either wired or wireless providing access to one or more electronically-accessible media, etc. In some embodiments, hardwired circuitry can be used in place of or in combination with software instructions. Thus, execution of sequences of instructions is not limited to any specific combination of hardware circuitry and software instructions. Sensor interface 314 is an interface that allows control system 40 to communicate with one or more sensors. Sensor interface 314 can be or can comprise, for example, one or more analog-to-digital converters that convert analog signals into digital signals that can be used by processor(s) 304.

The control system(s) 40 adjusts the speed of the rotor 18 by controlling generator torque and blade pitch. The control system(s) 40 adjusts blade pitch in response to changes in torque and wind speed. In this exemplary embodiment, the control system(s) 40 for adjusting the pitch is located in the hub 22. In alternative embodiments, the control system(s) may be located in the nacelle 16 or other location proximate to the wind turbine 10. The control system(s) 40 provides a control signal to power control modules (not shown) located in the hub 22. A power control module is assigned to each motor (not shown), also located in the hub 22. In alternative embodiments, the control system(s) may provide a current signal directly to DC motors in the blade pitch system 56.

In this exemplary embodiment, the control system(s) 40 provides a control signal(s) to the blade pitch system(s) to adjust each blade(s) 24 by operating the blade pitch system actuator(s). The control system(s) 40 may provide the same or similar control signal(s) to each blade pitch system(s) 56, or the control system(s) 40 may provide different control signal(s) to each blade pitch system(s) 56 to control the blade pitch of each blade(s) 24 independently.

During normal operating conditions, the control system(s) 40 provides a nominal control signal(s) to the blade pitch system 56 to operate the blade pitch system 56 at a nominal continuous torque to change the blade angle of the blade(s) to the commanded pitch setting. In one embodiment, during normal operating conditions, the control system(s) 40 provides a nominal control signal to power control module(s) to operate the blade pitch system motor(s) at a nominal continuous torque to change the blade angle of the blade(s) to the commanded pitch setting. For example, the nominal control signal(s) may command the power control module(s) to provide a nominal 30 amp current to the blade pitch system motor(s) to change the blade angle to the commanded pitch setting. In another embodiment, during normal operating conditions, the control system(s) 40 provides nominal control signal(s) that provides a nominal current directly to the motor(s) to drive the pitch actuator(s) at a nominal continuous torque to change the blade angle to the commanded pitch setting. For example, a nominal control signal(s) may provide a nominal current of approximately 30 amps directly to the motor(s) to drive the pitch actuator(s) at a nominal continuous torque to change the blade angle to the commanded pitch setting. In yet another embodiment, during normal operating conditions, the control system(s) (40) provides a nominal control signal(s) that provides a nominal hydraulic pressure to drive the actuator(s) to change the blade angle of the blade(s) to the commanded pitch setting.

According to this disclosure, when the control system(s) 40 determines that the pitch system(s) has failed to follow the commanded pitch setting to obtain blade angle asymmetry of the blade(s), the control system(s) 40 sends a short duration pulsed control signal(s) to pulse the blade pitch system with a pulsed torque to change the blade angle to the commanded pitch setting. In other words, the control system(s) 40 applies a short duration torque pulse(s) to the pitch actuator(s) to un-stick the actuator. In one embodiment, the control system(s) 40 provides a pulsed control signal to power control module(s) to operate the blade pitch system motor(s) at a pulsed torque to change the blade angle of the blade(s) to the commanded pitch setting. For example, the pulsed control signal(s) may command the power control module(s) to provide a current pulse(s) having a minimum current and a maximum current, for example having a minimum current of approximately 30 amps to a maximum current of approximately 50 amps, to the blade pitch system motor(s) to change the blade angle to the commanded pitch setting. In another example, the pulsed control signal(s) may command the power control module(s) to provide a pulsed current having a minimum current less than 30 amps, for example zero amps, and up to a maximum current of up to 50 amps, for example 50 amps, to the blade pitch system motor(s) to change the blade angle to the commanded pitch setting.

In another embodiment, the control system(s) 40 provides a pulsed control signal(s) that provides a pulsed current directly to the motor(s) to drive the pitch actuator(s) at a pulsed torque to change the blade angle to the commanded pitch setting. For example, a pulsed control signal(s) may provide a pulsed current having a minimum current of approximately 30 amps and a maximum current of approximately 50 amps directly to the motor(s) to drive the pitch actuator(s) at a pulsed torque to change the blade angle to the commanded pitch setting. In another example, a pulsed control signal(s) may provide a pulsed current having a minimum pulsed current of less than approximately 30 amps, for example zero amps, and a maximum pulsed current of up to approximately 50 amps, for example approximately 50 amps, directly to the motor(s) to drive the pitch actuator(s) at a pulsed torque to change the blade angle to the commanded pitch setting.

In alternative embodiments, the blade pitch system 56 may be operated by a hydraulic system(s) that uses hydraulic pressure instead of an electric motor(s) to apply torque to the pitch actuator(s), and the pulsed torque may be applied to the blade pitch system 56 by pumps and valves configured to receive a pulse torque command from the control system(s) 40. Additionally, it should be apparent to one of ordinary skill in the art that the pulsed control may be initially built into the blade pitch system, or a blade pitch system may be modified to additionally perform the pulsed control capability.

The peak torque is limited by system electrical and mechanical constraints recognized by the control system(s) 40. The pulse amplitude, pulse duration, pulsing frequency, and other relevant characteristics of this control can be adjustable and determined by the control system(s) 40 based on system performance and design constraints.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of controlling a pitch control system of a wind turbine, comprising:
   providing a nominal control signal to adjust a blade pitch angle of at least one rotor blade by operating the pitch control system at a nominal continuous torque to achieve a commanded pitch angle;
   determining if the commanded pitch angle has been achieved in response to the nominal control signal; and
   sending a pulsed control signal to the pitch control system to adjust the blade pitch angle of the at least one rotor blade by a pulsed torque if the nominal control signal has failed to achieve the commanded pitch angle.

2. The method of claim 1, wherein the pulsed torque includes a maximum torque greater than the nominal continuous torque.

3. The method of claim 1, wherein the pulsed torque includes a maximum torque lesser than the nominal continuous torque.

4. The method of claim 2, wherein the pulsed torque further includes a minimum torque approximately equal to the nominal continuous torque.

5. The method of claim 2, wherein the pulsed torque further includes a minimum torque less than the nominal continuous torque.

6. The method of claim 1, wherein the pulsed control signal includes pulse amplitude, pulse duration and pulsing frequency.

7. The method of claim 1, wherein the nominal control signal provides a continuous current to a pitch control system motor to provide a continuous torque to adjust the blade pitch angle, and the pulsed control signal provides a pulsed current to the motor to provide a pulsed torque to adjust the blade pitch angle.

8. The method of claim 1, wherein the nominal control signal provides a continuous hydraulic pressure to a pitch control system actuator to provide a continuous torque to adjust the blade pitch angle, and the pulsed control signal provides a pulsed hydraulic pressure to the pitch control system actuator to provide a pulsed torque to adjust the blade pitch angle.

9. A wind turbine, comprising:
   a rotor comprising a hub, at least one rotor blade coupled to the hub, and a rotor shaft coupled to the hub for rotation therewithin;
   an electrical generator coupled to the rotor shaft, the electrical generator configured to couple to an electrical load;
   a blade pitch actuator coupled to the at least one rotor blade for controlling an angle of pitch of the at least one rotor blade; and
   at least one control system coupled to said blade pitch actuator;
   wherein the at least one control system is configured to provide a command pitch signal to apply a continuous torque to the at least one blade pitch actuator to achieve the commanded pitch angle, and wherein the at least one control system is further configured to provide a pulsed command pitch signal to apply a pulsed torque having a maximum torque to the blade pitch actuator to achieve the commanded pitch angle if the command pitch signal fails to achieve the commanded pitch angle.

10. The wind turbine of claim 9, wherein the blade pitch actuator is coupled to an electric motor that applies torque to adjust the blade pitch angle, the electric motor coupled to the control system for receiving the command pitch signal.

11. The wind turbine of claim 9, wherein the blade pitch actuator is coupled to a hydraulic system that applies torque to the at least one blade pitch actuator to adjust the blade pitch angle, the hydraulic system coupled to the control system for receiving the command pitch signal.

12. The wind turbine of claim 9, wherein the pulsed command pitch signal includes pulse amplitude, pulse duration and pulsing frequency of the peak torque.

13. A pitch control system, comprising:
   at least one blade pitch actuator coupled to the at least one rotor blade of a wind turbine for controlling an angle of pitch of the at least one rotor blade; and
   at least one electric motor or at least one hydraulic system coupled to the at least one blade pitch actuator; and
   at least one control system coupled to the electric motor or hydraulic system;
   wherein the at least one control system is configured to provide a command pitch signal to either the electric motor or hydraulic system to apply a continuous torque to the at least one blade pitch actuator to achieve the commanded pitch angle, and wherein the control system is further configured to provide a pulsed command pitch signal to the electric motor or hydraulic system to apply a pulsed torque having a minimum torque and a maximum torque to the blade pitch actuator to achieve the commanded pitch angle if the command pitch signal fails to achieve the commanded pitch angle.

14. The pitch control system of claim 13, wherein at least one electric motor is coupled to the at least one blade pitch actuator.

15. The pitch control system of claim 13, wherein at least one hydraulic system is coupled to the at least one blade pitch actuator.

16. The pitch control system of claim 13, wherein the pulsed command pitch signal includes pulse amplitude, pulse duration and pulsing frequency of the peak torque.

17. The pitch control system of claim 13, wherein the minimum torque is approximately equal to the continuous torque.

18. The pitch control system of claim 14, wherein the at least one electric motor receives a continuous current to apply the continuous torque, and wherein the at least one electric motor receives a pulsed current having a minimum current and a maximum current to apply the pulsed torque.

* * * * *